United States Patent
Smith et al.

(10) Patent No.: US 10,690,079 B2
(45) Date of Patent: Jun. 23, 2020

(54) METHOD FOR DIAGNOSING AND CONTROLLING AMMONIA OXIDATION IN SELECTIVE CATALYTIC REDUCTION DEVICES

(71) Applicant: GM GLOBAL TECHNOLOGY OPERATIONS LLC, Detroit, MI (US)

(72) Inventors: Michael A. Smith, Clarkston, MI (US); Sarah Funk, Canton, MI (US); David E. Edwards, Rochester Hills, MI (US); Min Sun, Troy, MI (US); Gongshin Qi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 21 days.

(21) Appl. No.: 15/838,860

(22) Filed: Dec. 12, 2017

(65) Prior Publication Data
US 2019/0178187 A1  Jun. 13, 2019

(51) Int. Cl.
*F02D 41/14* (2006.01)
*B01D 53/94* (2006.01)
*F01N 3/10* (2006.01)
*F01N 3/20* (2006.01)
*F01N 11/00* (2006.01)

(52) U.S. Cl.
CPC ..... *F02D 41/1463* (2013.01); *B01D 53/9418* (2013.01); *B01D 53/9495* (2013.01);
(Continued)

(58) Field of Classification Search
CPC combination set(s) only.
See application file for complete search history.

(56) References Cited

U.S. PATENT DOCUMENTS

| 7,178,328 B2 | 2/2007 | Solbrig |
| 7,736,595 B2 * | 6/2010 | Gady ...................... F01N 3/208 422/105 |

(Continued)

*Primary Examiner* — Binh Q Tran
(74) *Attorney, Agent, or Firm* — Cantor Colburn LLP

(57) ABSTRACT

An emissions control system for treating exhaust gas containing $NO_x$ emissions from an internal combustion engine comprises a selective catalytic reduction (SCR) device that stores reductant that reacts with the $NO_x$ emissions, a reductant supply system configured to inject the reductant according to a reductant storage model; $NO_x$ module(s) configured to generate an $NO_x$ concentration signal indicating an $NO_x$ concentration, temperature module(s) configured to generate a temperature signal indicating an SCR temperature of the SCR device, and a control module operably connected to the reductant supply system, the $NO_x$ module, and the temperature module. The control module is configured to determine an amount of the reductant that is parasitically oxidized based on the $NO_x$ concentration signal and the temperature signal, and to determine a correction factor based on the amount of parasitically oxidized reductant to modify the reductant storage model.

20 Claims, 2 Drawing Sheets

(52) U.S. Cl.
CPC ............ *F01N 3/105* (2013.01); *F01N 3/208* (2013.01); *F01N 3/2066* (2013.01); *F01N 11/002* (2013.01); B01D 2251/2062 (2013.01); B01D 2255/50 (2013.01); F01N 2550/02 (2013.01); F01N 2560/026 (2013.01); F01N 2560/06 (2013.01); F01N 2570/18 (2013.01); F01N 2610/02 (2013.01); F01N 2900/1602 (2013.01); F01N 2900/1622 (2013.01); F02D 2041/1468 (2013.01); F02D 2200/0802 (2013.01)

(56) References Cited

U.S. PATENT DOCUMENTS

| | | | |
|---|---|---|---|
| 8,429,898 B2 | 4/2013 | Darr et al. | |
| 8,453,434 B2* | 6/2013 | Yacoub | F01N 3/208 60/286 |
| 8,454,916 B2 | 6/2013 | Perrin et al. | |
| 8,474,248 B2 | 7/2013 | Sun et al. | |
| 8,578,705 B2* | 11/2013 | Sindano | F01N 3/208 60/295 |
| 8,863,503 B2* | 10/2014 | Yasui | F01N 3/10 60/274 |
| 8,893,475 B2* | 11/2014 | Geveci | F01N 3/208 60/274 |
| 10,233,811 B2* | 3/2019 | Smith | F01N 3/023 |
| 10,322,373 B2* | 6/2019 | Miller | F01N 3/2013 |
| 2010/0050614 A1* | 3/2010 | Parmentier | F01N 3/208 60/287 |
| 2013/0263575 A1* | 10/2013 | Sun | F01N 11/00 60/274 |
| 2015/0033704 A1 | 2/2015 | Ardanese et al. | |
| 2015/0218993 A1* | 8/2015 | Chavannavar | F01N 3/208 423/239.1 |

* cited by examiner

METHOD FOR DIAGNOSING AND CONTROLLING AMMONIA OXIDATION IN SELECTIVE CATALYTIC REDUCTION DEVICES

INTRODUCTION

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC"), nitrogen oxides ("$NO_x$"), oxides of sulfur ("$SO_x$"), as well as condensed phase materials (liquids and solids) that constitute particulate matter ("PM"). Catalyst compositions, typically disposed on catalyst supports or substrates, are provided in an engine exhaust system as part of an after treatment system to convert certain, or all, of these exhaust constituents into non-regulated exhaust gas components.

Emissions control systems typically include selective catalytic reduction (SCR) devices. A SCR device includes a substrate having a SCR catalyst disposed thereon to reduce the amount of $NO_x$ in the exhaust gas. The typical exhaust treatment system also includes a reductant delivery system that injects a reductant such as, for example, ammonia ($NH_3$) or urea ($CO(NH_2)_2$, etc.). The amount of reductant stored by the SCR catalyst is referred to as current storage (e.g., grams). The SCR device makes use of the reductant to reduce the $NO_x$. For example, when the proper amount of reductant is supplied to the SCR device and stored in the SCR, the reductant reacts with the $NO_x$ in the presence of the SCR catalyst to reduce the $NO_x$ emissions. The percentage of $NO_x$ input to the SCR catalyst that is removed from the exhaust is referred to as the $NO_x$ conversion efficiency. The $NO_x$ conversion efficiency is related to the current storage of the SCR catalyst. For example, the $NO_x$ conversion efficiency increases as the current storage of the SCR catalyst increases and vice versa. However, at lower temperatures and at higher concentrations of $NO_x$, a portion of the supplied reductant is not stored in the SCR and may instead be parasitically oxidized resulting in under-prediction of stored reductant on the SCR device. Accordingly, it would be desirable to provide improved methods for determining, controlling, and optimizing reductant storage and consumption.

SUMMARY

In one exemplary embodiment an emissions control system for treating exhaust gas containing $NO_x$ emissions from an internal combustion engine is provided. The emissions control system comprises a selective catalytic reduction (SCR) device that stores a reductant that reacts with the $NO_x$ emissions, a reductant supply system configured to inject the reductant according to a reductant storage model, and at least one $NO_x$ module configured to generate a $NO_x$ concentration signal indicating a $NO_x$ concentration. The emissions control system further includes at least one temperature module configured to generate a temperature signal indicating an SCR temperature of the SCR device, and a control module operably connected to the reductant supply system, the at least one $NO_x$ module, and the at least one temperature module. The control module is configured to determine an amount of the reductant that is parasitically oxidized based on the $NO_x$ concentration signal and the temperature signal, and to determine a correction factor based on the amount of parasitically oxidized reductant to modify the reductant storage model.

In addition to one or more of the features described herein, the amount of parasitically oxidized reductant is based on the $NO_x$ concentration and the amount of the reductant stored in the SCR device.

In an embodiment, the control module adjusts the amount of the reductant that is injected in response to modifying the reductant storage model with the correction factor.

In an embodiment, the correction factor is based on the amount of parasitically oxidized reductant and an actual amount of reductant stored on the SCR device.

In an embodiment, the amount of reductant stored on the SCR device is based on the reductant storage model stored in a memory unit and an age of the SCR device.

In an embodiment, the control module adjusts the amount of the reductant that is injected until at least one of a selected duration ends, the SCR temperature is greater than a predetermined threshold, and the $NO_x$ concentration is less than a predetermined threshold.

In an embodiment, the control module determines the correction factor in response to a rate of change of the amount of parasitically oxidized reductant in the SCR device.

In an embodiment, the control module adjusts the amount of the reductant that is injected until a predetermined amount of the reductant is stored on the SCR device.

In an embodiment, the at least one $NO_x$ module comprises a $NO_x$ sensor disposed upstream of the SCR device.

In an embodiment, the emissions control system further comprises an $NO_x$ sensor downstream of the SCR device.

In another exemplary embodiment a method for correcting a reductant storage model that controls an amount of a reductant injected in an exhaust treatment system of an internal combustion engine is provided. The method comprises storing the reductant on an selective catalytic reduction (SCR) device to reduce an amount of $NO_x$ emissions contained in exhaust gas flowing through the exhaust treatment system, generating a $NO_x$ concentration signal indicating a $NO_x$ concentration using a $NO_x$ module, and generating a temperature signal indicating a SCR temperature of the SCR device using a temperature module. The method next determines an amount of the reductant that is parasitically oxidized based on the $NO_x$ concentration signal and the temperature signal, determines a correction factor based on the amount of the reductant that is parasitically oxidized, and then modifies the reductant storage model based on the correction factor.

In an embodiment, the amount of parasitically oxidized reductant is based on the $NO_x$ concentration and the amount of the reductant stored in the SCR device.

In an embodiment, the method further comprises increasing the amount of the reductant that is injected based on the correction factor.

In an embodiment, the correction factor is based on the amount of parasitically oxidized reductant and an actual amount of reductant stored on the SCR device.

In an embodiment, the amount of reductant stored on the SCR device is based on the reductant storage model stored in a memory unit and an age of the SCR device.

In an embodiment, the method further comprises adjusting the amount of the reductant that is injected until at least one of a selected duration ends, the SCR temperature is greater than a predetermined threshold, and the $NO_x$ concentration is less than a predetermined threshold.

In an embodiment, the method further comprises determining the correction factor in response to a rate of change of the amount of parasitically oxidized reductant in the SCR device.

In an embodiment, the method further comprises increasing the amount of the reductant that is injected until a predetermined amount of the reductant is stored on the SCR device.

In an embodiment, further comprising generating a $NO_x$ concentration signal indicating a $NO_x$ concentration upstream of the SCR device.

In an embodiment, the method comprises generating a $NO_x$ concentration signal indicating a $NO_x$ concentration downstream of the SCR device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
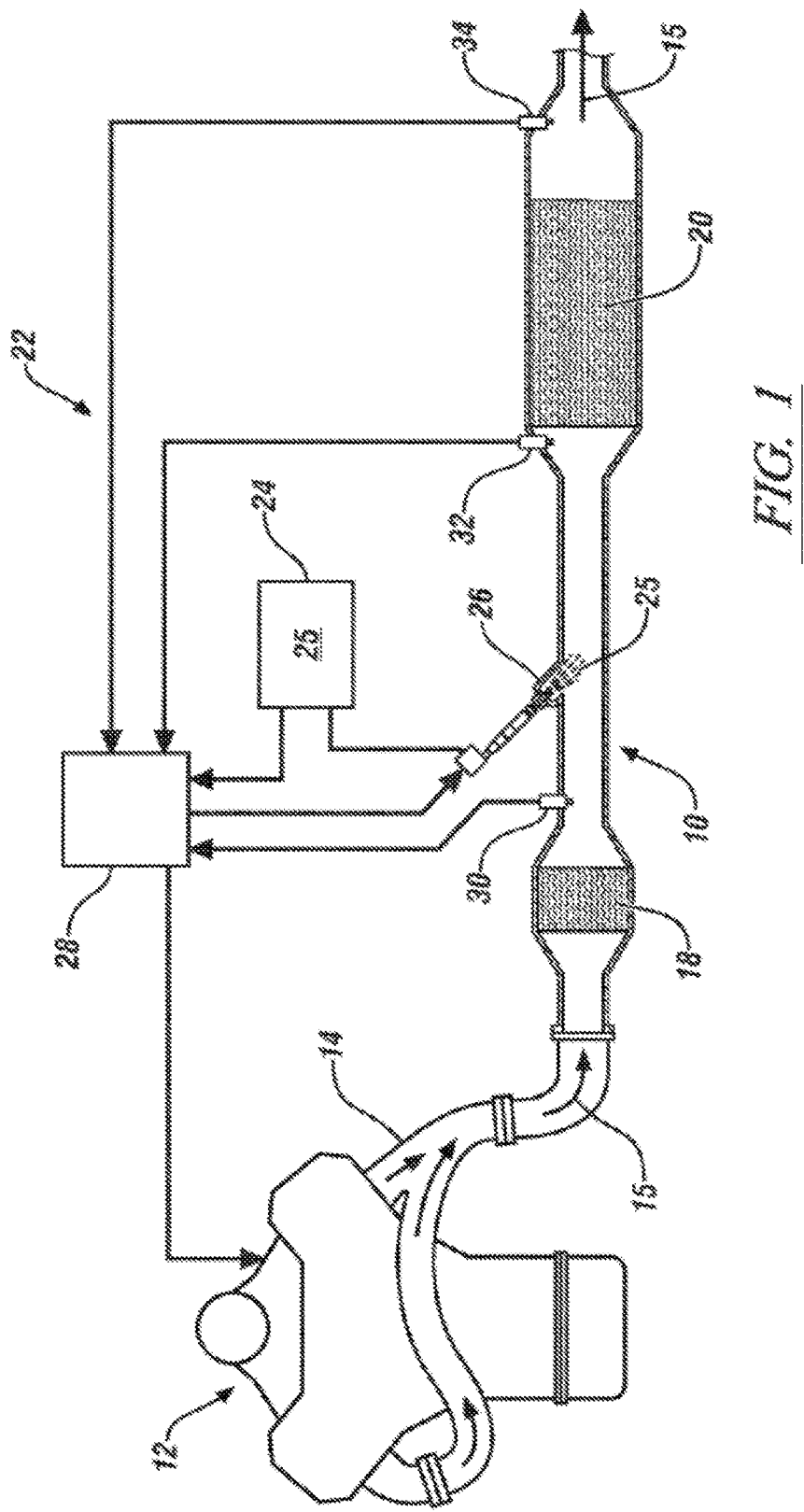
FIG. 1 is a schematic diagram of an exhaust gas treatment system including a reductant supply system in accordance with exemplary embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application, or uses. It should be understood that throughout the drawings, corresponding reference numerals indicate like or corresponding parts and features.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

Additionally, the term "exemplary" is used herein to mean "serving as an example, instance or illustration." The embodiments or designs described herein as "exemplary" are not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

Referring now to FIG. 1, an exemplary embodiment is directed to an emissions control system 10, for the reduction of regulated exhaust gas constituents of an internal combustion (IC) engine 12 (i.e., engine 12). The emissions control system described herein can be implemented in various engine systems. Such engine systems may include, for example, but are not limited to diesel engine systems, gasoline direct injection systems, and homogeneous charge compression ignition engine systems.

The emissions control system 10 generally includes one or more exhaust gas conduits 14, and one or more exhaust treatment devices. The exhaust treatment devices include, but are not limited to, an oxidation catalyst device (OC) 18, and a selective catalytic reduction (SCR) device 20 (i.e., SCR device 20). As can be appreciated, the emissions control system 10 of the present disclosure may include various combinations of one or more of the exhaust treatment devices shown in FIG. 1, and/or other exhaust treatment devices (not shown) and is not limited to the present example.

In FIG. 1, the exhaust gas conduit 14, which may comprise several segments, transports exhaust gas 15 from the engine 12 to the various exhaust treatment devices of the emissions control system 10. As can be appreciated, the OC 18 can be of various flow-through, oxidation catalyst devices known in the art. In various embodiments the OC 18 may include a flow-through metal or ceramic monolith substrate. The substrate may be packaged in a stainless steel shell or canister having an inlet and an outlet in fluid communication with the exhaust gas conduit 14. The substrate may include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The SCR device 20 may be disposed downstream of the OC 18, and also may be configured to filter the exhaust gas 15 of carbon and other particulates as well as to reduce $NO_x$ constituents in the exhaust gas. As can be appreciated, the SCR device 20 can be constructed of various materials known in the art. In various embodiments, for example, the SCR device 20 may be constructed using a wall flow monolith filter or other devices, such as, for example, wound or packed fiber filters, open cell foams, sintered metal fibers, etc. In various embodiments, the SCR device 20 includes an SCR catalyst composition applied to the filter. The SCR device 20 may utilize a reductant, such as ammonia ($NH_3$) to reduce the $NO_x$. More specifically, the SCR catalyst composition can contain a zeolite and one or more base metal components such as iron (Fe), cobalt (Co), copper (Cu), or vanadium (V), which operate efficiently to convert $NO_x$ constituents in the exhaust gas 15 in the presence of $NH_3$. The reductant utilized by the SCR device 20 may be in the form of a gas, a liquid, or an aqueous urea solution and may be mixed with air to aid in the dispersing of the injected spray.

In at least one exemplary embodiment illustrated in FIG. 1, a $NH_3$ reductant may be supplied from a reductant supply system 22. The reductant supply system 22 includes a reductant supply source 24, an injector 26, and a control module 28. The reductant supply source 24 stores a reductant 25 and is in fluid communication with the injector 26.

The reductant 25 may include, but is not limited to, $NH_3$, and urea. Accordingly, the injector 26 may inject a selectable amount of reductant 25 into the exhaust gas conduit 14 such that the reductant 25 is introduced to the exhaust gas 15 at a location upstream of the SCR device 20.

The control module 28 may control the engine 12 and the reductant supply system 22 based on sensed and/or modeled data. In various embodiments, the control module 28 further diagnoses one or more sub-systems and/or devices of the emissions control system 10 based on one or more sensed and/or modeled inputs based on the diagnostic methods and systems of the present disclosure. The emissions control system 10 includes one or more sensors 30, 32, and 34, wherein each sensor can be a $NO_x$ concentration sensor, a temperature sensor, or a combined sensor for both $NO_x$ concentration and temperature. In one example, the control module 28 is in electrical communication with a first $NO_x$ concentration sensor, for example a first $NO_x$ concentration sensor 30 disposed at the outlet of the OC 18 upstream of the SCR device 20, and a second $NO_x$ concentration sensor, for example a second $NO_x$ concentration sensor 34 disposed downstream from the SCR device 20. The first $NO_x$ concentration sensor 30 senses a concentration of $NO_x$ in the exhaust gas 15 at the outlet of the OC 18 and generates a first $NO_x$ concentration signal based thereon. The second $NO_x$ concentration sensor 34 senses a concentration of $NO_x$ in the exhaust gas 15 at the outlet of the SCR device 20 and generates a $NO_x$ concentration signal based thereon. Although the exemplary embodiment illustrated in FIG. 1 describes two $NO_x$ concentration sensors, it is appreciated that less or more sensors may be included. In addition, the invention is not limited to the location of the sensors described above. While $NO_x$ sensors are described as $NO_x$ concentration sensors, any device capable of sensing an amount of $NO_x$ can be used.

In some embodiments, the control module 28 is further in electrical communication with a temperature sensor, for example a temperature sensor 32 disposed at the inlet of the SCR device 20. The temperature sensor 32 senses a temperature in the exhaust gas 15 at the inlet of the SCR device 20 and generates a temperature signal based thereon. Although the exemplary embodiment illustrated in FIG. 1 describes one temperature sensor, it is appreciated that more temperature sensors may be included. In addition, the invention is not limited to the location of the sensors described above.

The control module 28 may determine the $NO_x$ concentration in the SCR device 20. The $NO_x$ concentration may be determined according to various measurements, algorithms, and/or models known to those of ordinary skill in the art. Similarly, the control module 28 may determine the temperature of the SCR device at numerous locations. The temperature may be determined according to various measurements, algorithms, and/or models known to those of ordinary skill in the art.

The control module 28 receives at least one $NO_x$ concentration signal from at least one $NO_x$ module, and receives at least one temperature signal from at least one temperature module, and controls operation of the injector 26 according to a reductant storage model. In an embodiment, the emissions control system 10 includes sensors 30, 32, and 34, wherein each sensor is both a $NO_x$ concentration sensor and a temperature sensor. The $NO_x$ module includes a $NO_x$ concentration sensor, for example a $NO_x$ concentration sensor 30, and the temperature module includes a temperature sensor, for example a temperature sensor 32 as illustrated in FIG. 1. In another exemplary embodiment, the $NO_x$ module and/or the temperature module each may include a control module that stores one or more $NO_x$ concentration models and/or temperature models. The $NO_x$ concentration sensor 30 and/or temperature sensor 32, and/or other $NO_x$ concentration sensors, and/or other temperature sensors, and/or the $NO_x$ concentration models and/or the temperature models may provide a determined $NO_x$ concentration and/or temperature of a respective component and/or thermal area. For example, the temperature sensor 32 and/or a temperature model may determine a temperature indicating an SCR temperature of the SCR device 20. For example, the $NO_x$ concentration sensor 30 and/or a $NO_x$ concentration model may determine a $NO_x$ concentration at the upstream side of the SCR device 20. In addition, the control module 28 may determine a correction factor corresponding to the reductant storage model based on the $NO_x$ concentration signal and the temperature signal, and may more precisely control the amount of injected reductant 25 provided by the injector 26, as described in greater detail herein. Accordingly, the supply of reductant 25 may be utilized more efficiently.

Figure 2:
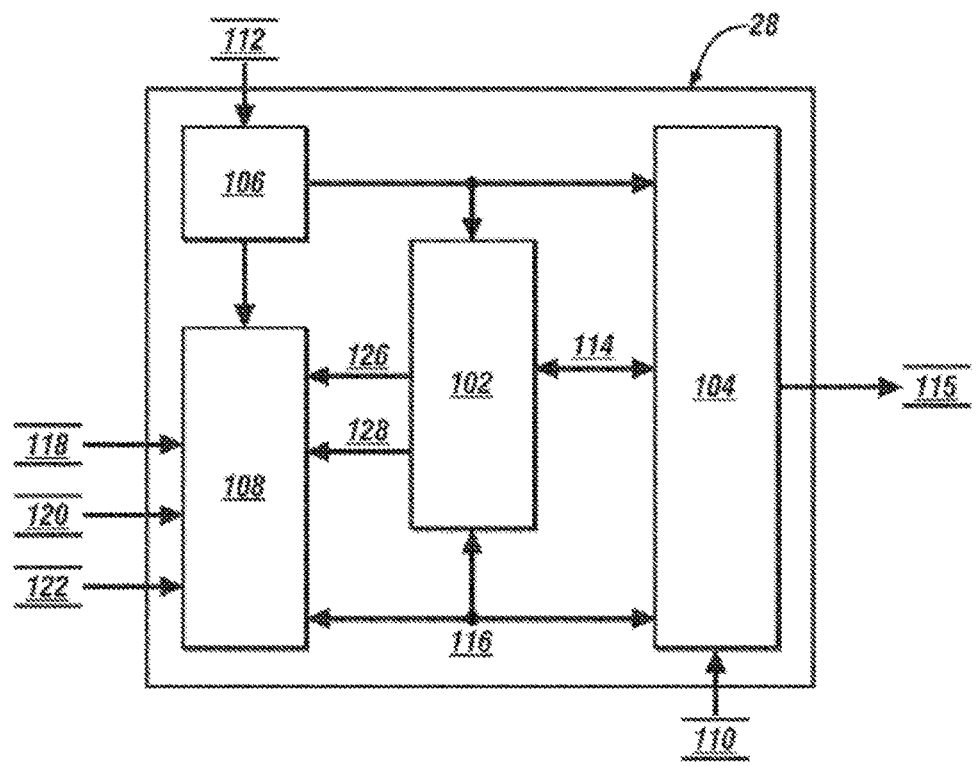
FIG. 2 is a block diagram illustrating a control module that generates a correction factor of reductant load model of a reductant supply system in accordance with an exemplary embodiment.

Turning now to FIG. 2, a block diagram illustrates a control module 28 that determines a correction factor corresponding to a reductant storage model to more precisely control the amount of injected reductant 25 provided by the reductant supply system 22. Various embodiments of the emissions control system 10 of FIG. 1 according to the present disclosure may include any number of sub-modules embedded within the control module 28. As can be appreciated, the sub-modules shown in FIG. 2 may be combined or further partitioned as well.

As illustrated in FIG. 2, the control module 28 according to at least one embodiment includes memory 102, a reductant module 104, an entry condition module 106, and a parasitically oxidized reductant correction module 108. Each of the modules 104-108 interfaces and electrically communicates with the memory 102 to retrieve and update stored values as needed.

In one embodiment, the memory 102 stores one or more threshold values, time periods over which the $NO_x$ concentrations and temperatures were measured, a number of configurable limits, maps, data values, variables, and system models used to control the reductant supply system 22. In at least one exemplary embodiment, the memory 102 stores a reductant storage model that determines an amount of reductant stored on the SCR device 20. The reductant storage model utilizes various operating parameters provided by at least one model and/or vehicle sensors to determine the stored reductant including, but not limited to, exhaust flow rate, and reductant injection rate.

The memory 102 may also store one or more $NO_x$ concentration thresholds, one or more $NO_x$ concentration threshold ranges, one or more temperature thresholds, and/or more temperature threshold ranges corresponding to a respective soot combustion temperature. In addition, the memory 102 may store one or more $NO_x$ concentration device models, one or more temperature SCR device models, and/or one or more reductant oxidation device models. In an embodiment, at least one $NO_x$ concentration device model may include a first reductant oxidation model and a second reductant oxidation model, for example as shown in Equations 1 and 2:

$$4NH_3 + 5O_2 + NO \rightarrow 5NO + 6H_2O \qquad \text{Equation 1}$$

$$4NH_3 + 4O_2 + 2NO_2 \rightarrow 6NO + 6H_2O \qquad \text{Equation 2}$$

In Equations 1 and 2, the reductant is ammonia ($NH_3$), and is oxidized by $NO_x$ species including nitric oxide (NO) and nitrogen dioxide ($NO_2$). Overall, the result is an observed increase in $NH_3$ consumption influenced by $NO_x$ concentration. In other words, at least a portion of the $NO_x$ conversion efficiency is lost because higher $NO_x$ concentrations result in the under prediction of stored $NH_3$ on the SCR device.

The first reductant oxidation model and/or the second reductant oxidation model may utilize the temperature signal generated by the first temperature sensor 30 disposed at the outlet of the OC 18, a distance between the OC 18 and the SCR device 20, and a temperature of the SCR device 20 to determine a rate of change of the amount of parasitically oxidized reductant in the SCR device 20 as discussed above. The first reductant oxidation model and/or the second reductant oxidation model may determine the amount of parasitically oxidized reductant of the SCR device 20 based on the change in $NO_x$ concentration at the inlet of the SCR device 20 over a selected time period.

The reductant module 104 may process a reductant storage model signal 114 indicative of a reductant storage model stored in the memory 102 to control operation of the reductant supply system 22. For example, the reductant storage model may indicate the amount of reductant that should be stored, (i.e., contained) on the SCR device 20 during various driving conditions 110. By detecting the driving conditions 110 by one or more sensors (e.g. temperatures sensors, pressures sensors, $NO_x$ sensors, etc.), the reductant module 104 determines an amount of reductant 25 to be injected and generates an injector control signal 115 to control the injector 26 accordingly.

In at least one embodiment, the reductant module 104 may control the injector 26 to inject the reductant 25 in response to receiving one or more entry conditions 112 provided by the entry condition module 106. The entry conditions 112 may include, for example, an increase in $NO_x$ concentration at a given exhaust temperature. The increase in $NO_x$ concentration at a given exhaust temperature may be detected by comparing a change in the $NO_x$ concentration to a predetermined threshold at each temperature. If the change in $NO_x$ concentration at a given exhaust gas temperature exceeds the respective predetermined threshold, the entry condition 112 (i.e., the excessive $NO_x$ concentration change) may be determined. When the SCR device 20 realizes excessive $NO_x$ concentration changes, however, reductant may be parasitically oxidized in the SCR device 20. Consequently, the amount of reductant stored on the SCR device 20 is reduced.

The parasitically oxidized reductant correction module 108 may determine the amount of parasitic oxidation of the reductant occurring in the SCR device 20 and may generate a correction signal 116 indicating a correction factor that compensates for the parasitically oxidized reductant. In an embodiment, the correction factor is based on the amount of parasitically oxidized reductant and an actual amount of reductant stored on the SCR device. The amount of parasitically oxidized reductant may be determined when one or more entry conditions 112 provided by the entry condition module 106 occurs, such as a $NO_x$ concentration change. The memory 102 may store a first reductant oxidation model and a second reductant oxidation model to determine the amount of parasitically oxidized reductant in the SCR device 20 based on the $NO_x$ concentration, the change in the $NO_x$ concentration, and an actual stored amount (i.e., the amount of reductant currently stored) on the SCR device 20. In at least one embodiment illustrated in FIG. 2, the parasitically oxidized reductant correction module 108 may determine the $NO_x$ concentration and change in the $NO_x$ concentration based on a $NO_x$ concentration signal 118 provided by the $NO_x$ concentration sensor 30. In another exemplary embodiment, the parasitically oxidized reductant correction module 108 may determine the $NO_x$ concentration and the $NO_x$ concentration change based on a parasitic oxidation model signal indicative of a parasitic oxidation model stored in the memory 102 and a $NO_x$ concentration signal 120 provided by a $NO_x$ concentration sensor measuring the upstream side, for example the inlet of the SCR device 20 and/or a $NO_x$ concentration signal 122 provided by a $NO_x$ concentration sensor measuring the downstream side, for example the outlet of the SCR device 20.

The amount of reductant stored on the SCR device 20 may be determined according to a reductant storage model signal 126 indicative of the reductant storage model stored in memory 102. The age of the SCR device 20 also may be used to determine the amount of reductant stored on the SCR device 20. For example, as the age (e.g., the amount of use over time) of the SCR device 20 increases, the ability to maintain storage of the reductant decreases. In an exemplary embodiment, an age factor corresponding to a new SCR device 20 may be initially stored in the memory 102. Over time, the reductant module 104 may update the age factor based on a temperature realized by the SCR device 20 over a time period. The age factor may be provided to the parasitically oxidized reductant correction module 108 via an age factor signal 128, and applied to the determined amount of reductant indicated by the reductant storage model to determine the amount of reductant stored on the SCR device 20 more precisely.

The parasitically oxidized reductant correction module 108 may generate a correction value (i.e., a correction factor) based on a difference between the amount of reductant contained on the SCR device 20 and the amount of reductant parasitically oxidized in the SCR device 20. For example, if the amount of reductant contained on the SCR device 20 is determined as 2.0 grams (g) and the amount parasitically oxidized reductant in the SCR device 20 is 0.2 g, then parasitically oxidized reductant correction module 108 determines a correction value of 0.2 g, i.e., an additional 0.2 g of reductant 25 is needed. Based on the correction value, an additional amount of reductant 25 (e.g., 0.2 g of additional reductant 25) should be injected to compensate for the parasitically oxidized reductant in the SCR device 20. In an embodiment, the parasitically oxidized reductant correction module 108 adjusts the total amount of the reductant that is injected until at least one of a selected duration ends, the SCR temperature is greater than a predetermined threshold, the $NO_x$ concentration is less than a predetermined threshold. The thresholds and durations may be predetermined and stored in memory or may be calculated based on operational conditions.

The parasitically oxidized reductant correction module 108 may also determine a corrected amount of injected reductant 25 to achieve a desired storage of the SCR device 20 during certain driving conditions. For example, the reductant module 104 may determine a desired reductant storage of the SCR device 20, for example 3.0 g of reductant, based on one or more driving conditions of the vehicle. The reductant model may then determine the amount of reductant currently stored on the SCR device 20 taking into account any parasitically oxidized reductant in the SCR device 20 as discussed above. If, for example, the amount of reductant stored on the SCR device 20 is determined as 2.0 g and the amount of parasitically oxidized reductant in the SCR device 20 is 0.2 g, then the parasitically oxidized reductant correction module 108 determines that the SCR device 20 currently contains 1.8 g. Therefore, parasitically oxidized reductant correction module 108 determines that a total of 1.2 g of reductant must be injected to achieve the desired reductant storage of 3.0 g.

Figure 3:
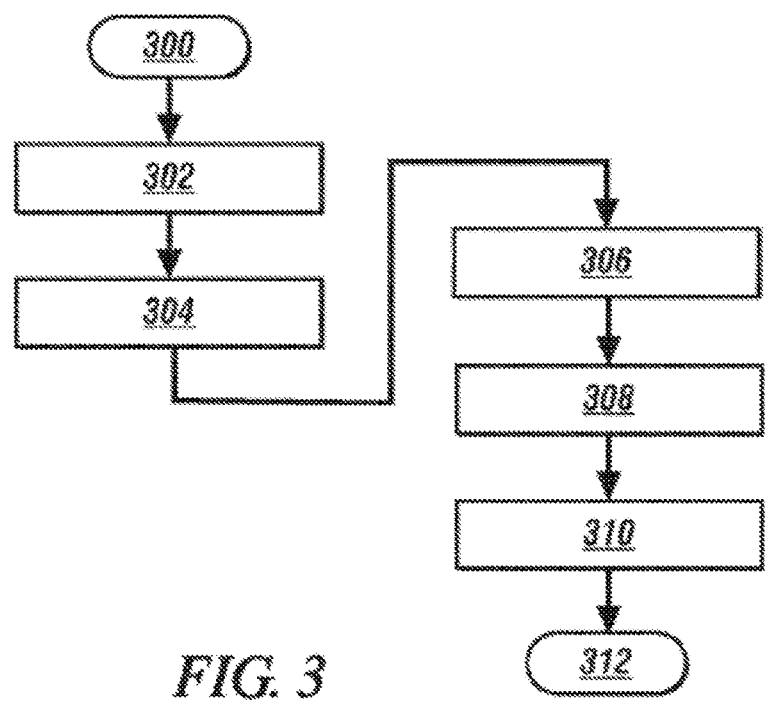
FIG. 3 is a flow diagram illustrating a method of generating a correction factor of a reductant load model in accordance with exemplary embodiments.

Turning now to FIG. 3, a flow diagram illustrates a method of determining a correction factor corresponding to reductant load model according to an exemplary embodiment. The method begins at operation 300 and proceeds to operation 302 to determine an amount of reductant stored on the SCR device (i.e., a reductant load of the SCR device). The amount of stored reductant may be based, for example, on a reductant storage model stored in a memory unit and an age of the SCR device. At operation 304, a $NO_x$ concentration and temperature at an inlet of the SCR device included in an exhaust treatment system is determined. The $NO_x$ concentration and temperature of the SCR device may be determined according to $NO_x$ concentration and temperature measurements, respectively, provided by one or more sensors and/or models for example. At operation 306, a $NO_x$ concentration and/or a change in $NO_x$ concentration of the SCR device is determined at a given temperature. At operation 308, an amount of parasitically oxidized reductant in the SCR device is determined based on the $NO_x$ concentration and/or change in $NO_x$ concentration and the temperature. Based on the amount of parasitically oxidized reductant, a correction factor is generated at operation 310, and the method ends at operation 312. The correction factor may be used to determine an amount of additional reductant that should injected to compensate for the parasitically oxidized reductant in the SCR device. Accordingly, a more accurate reductant load model may be generated that increases the overall efficiency of a reductant supply system.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas containing nitrogen oxides ($NO_x$) emissions from an internal combustion engine, the emissions control system comprising:
    a selective catalytic reduction (SCR) device that stores a reductant that reacts with the $NO_x$ emissions;
    a reductant supply system configured to inject the reductant via an injector according to a reductant storage model;
    at least one $NO_x$ module configured to generate a $NO_x$ concentration signal indicating a $NO_x$ concentration downstream of the injector at an inlet of the SCR device;
    at least one temperature module configured to generate a temperature signal indicating an SCR temperature of the SCR device; and
    a control module operably connected to the reductant supply system, the at least one $NO_x$ module, and the at least one temperature module,
    wherein the control module is configured to determine an amount of the reductant that is parasitically oxidized based on the $NO_x$ concentration signal and the temperature signal, and to determine a correction factor based on the amount of parasitically oxidized reductant to modify the reductant storage model, and
    wherein the amount of parasitically oxidized reductant is determined by a reductant oxidation model based on oxidation of ammonia by at least one of nitric oxide and nitrogen dioxide.

2. The emissions control system of claim 1, wherein the amount of parasitically oxidized reductant is based on the $NO_x$ concentration and the amount of the reductant stored in the SCR device.

3. The emissions control system of claim 1, wherein the control module adjusts the amount of the reductant that is injected in response to modifying the reductant storage model with the correction factor.

4. The emissions control system of claim 3, wherein the correction factor is based on the amount of parasitically oxidized reductant and an actual amount of reductant stored on the SCR device.

5. The emissions control system of claim 4, wherein the amount of reductant stored on the SCR device is based on the reductant storage model stored in a memory unit and an age of the SCR device.

6. The emissions control system of claim 5, wherein the control module adjusts the amount of the reductant that is injected until at least one of:
    a selected duration ends;
    the SCR temperature is greater than a predetermined threshold; and
    the $NO_x$ concentration is less than a predetermined threshold.

7. The emissions control system of claim 1, wherein the control module determines the correction factor in response to a rate of change of the amount of parasitically oxidized reductant in the SCR device.

8. The emissions control system of claim 1, wherein the control module adjusts the amount of the reductant that is injected until a predetermined amount of the reductant is stored on the SCR device.

9. The emissions control system of claim 1, further comprising a second $NO_x$ module comprising a second $NO_x$ sensor disposed upstream of the SCR device.

10. The emissions control system of claim 1, further comprising a $NO_x$ sensor downstream of the SCR device.

11. A method for correcting a reductant storage model that controls an amount of a reductant injected via an injector in an exhaust treatment system of an internal combustion engine, the method comprising:
    storing the reductant on an selective catalytic reduction (SCR) device to reduce an amount of nitrogen oxides ($NO_x$) emissions contained in exhaust gas flowing through the exhaust treatment system;
    generating a $NO_x$ concentration signal indicating a $NO_x$ concentration downstream of the injector at an inlet of the SCR device using an $NO_x$ module;
    generating a temperature signal indicating an SCR temperature of the SCR device using a temperature module;
    determining an amount of the reductant that is parasitically oxidized based on the $NO_x$ concentration signal and the temperature signal;
    determining a correction factor based on the amount of the reductant that is parasitically oxidized; and
    modifying the reductant storage model based on the correction factor,
    wherein the amount of the reductant that is parasitically oxidized is determined by a reductant oxidation model based on oxidation of ammonia by at least one of nitric oxide and nitrogen dioxide.

12. The method of claim 11, wherein the amount of parasitically oxidized reductant is based on the $NO_x$ concentration and the amount of the reductant stored in the SCR device.

13. The method of claim 11, further comprising increasing the amount of the reductant that is injected based on the correction factor.

14. The method of claim 13, wherein the correction factor is based on the amount of parasitically oxidized reductant and an actual amount of reductant stored on the SCR device.

15. The method of claim 14, wherein the amount of reductant stored on the SCR device is based on the reductant storage model stored in a memory unit and an age of the SCR device.

16. The method of claim 15, further comprising adjusting the amount of the reductant that is injected until at least one of:
a selected duration ends;
the SCR temperature is greater than a predetermined threshold; and
the $NO_x$ concentration is less than a predetermined threshold.

17. The method of claim 11, further comprising determining the correction factor in response to a rate of change of the amount of parasitically oxidized reductant in the SCR device.

18. The method of claim 11, further comprising increasing the amount of the reductant that is injected until a predetermined amount of the reductant is stored on the SCR device.

19. The method of claim 11, further comprising generating a second $NO_x$ concentration signal indicating a $NO_x$ concentration upstream of the SCR device.

20. The method of claim 11, further comprising generating a $NO_x$ concentration signal indicating a $NO_x$ concentration downstream of the SCR device.

* * * * *